United States Patent
Dantlgraber

(10) Patent No.: US 7,555,901 B2
(45) Date of Patent: Jul. 7, 2009

(54) DRIVE MECHANISM

(75) Inventor: Joerg Dantlgraber, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/573,501

(22) PCT Filed: Nov. 10, 2004

(86) PCT No.: PCT/DE2004/002485

§ 371 (c)(1),
(2), (4) Date: Apr. 4, 2006

(87) PCT Pub. No.: WO2005/052382

PCT Pub. Date: Jun. 9, 2005

(65) Prior Publication Data

US 2007/0084357 A1    Apr. 19, 2007

(30) Foreign Application Priority Data

Nov. 25, 2003   (DE) .................. 103 54 952

(51) Int. Cl.
*F15B 7/10*      (2006.01)
*B60T 17/02*     (2006.01)

(52) U.S. Cl. ............................ 60/571; 60/534; 60/545; 60/573

(58) Field of Classification Search .............. 60/545, 60/572, 573, 591, 592, 534
See application file for complete search history.

(56) References Cited

U.S. PATENT DOCUMENTS

| | | | |
|---|---|---|---|
| 2,368,659 A * | 2/1945 | Heineck et al. | 60/573 |
| 2,924,944 A * | 2/1960 | Matlachowsky | 60/534 |
| 4,181,003 A   | 1/1980 | Kononov et al. | |
| 5,533,336 A * | 7/1996 | Kiat et al. | 60/534 |
| 5,863,474 A   | 1/1999 | Ito et al. | |
| 6,109,036 A * | 8/2000 | Koike et al. | 60/534 |
| 6,539,853 B1 *| 4/2003 | Hess et al. | 60/534 |
| 2003/0175380 A1 | 9/2003 | Dantlgraber | |

FOREIGN PATENT DOCUMENTS

| | | |
|---|---|---|
| DE | 101 43 013 A1 | 3/2003 |
| DE | 101 35 516 A1 | 6/2003 |
| EP | 1 310 346 A1 | 5/2003 |
| GB | 2 053 364 A | 2/1981 |

* cited by examiner

*Primary Examiner*—F. Daniel Lopez
(74) *Attorney, Agent, or Firm*—Oliff & Berridge, PLC

(57) ABSTRACT

What is disclosed is a drive mechanism, in particular for blanking and nibbling machines, comprising a hydraulic force transmitting element and a spindle drive for driving the force transmitting element, wherein a pre-tensioning means for pre-tensioning the force transmitting element is provided.

12 Claims, 2 Drawing Sheets

DRIVE MECHANISM

Figure 1:
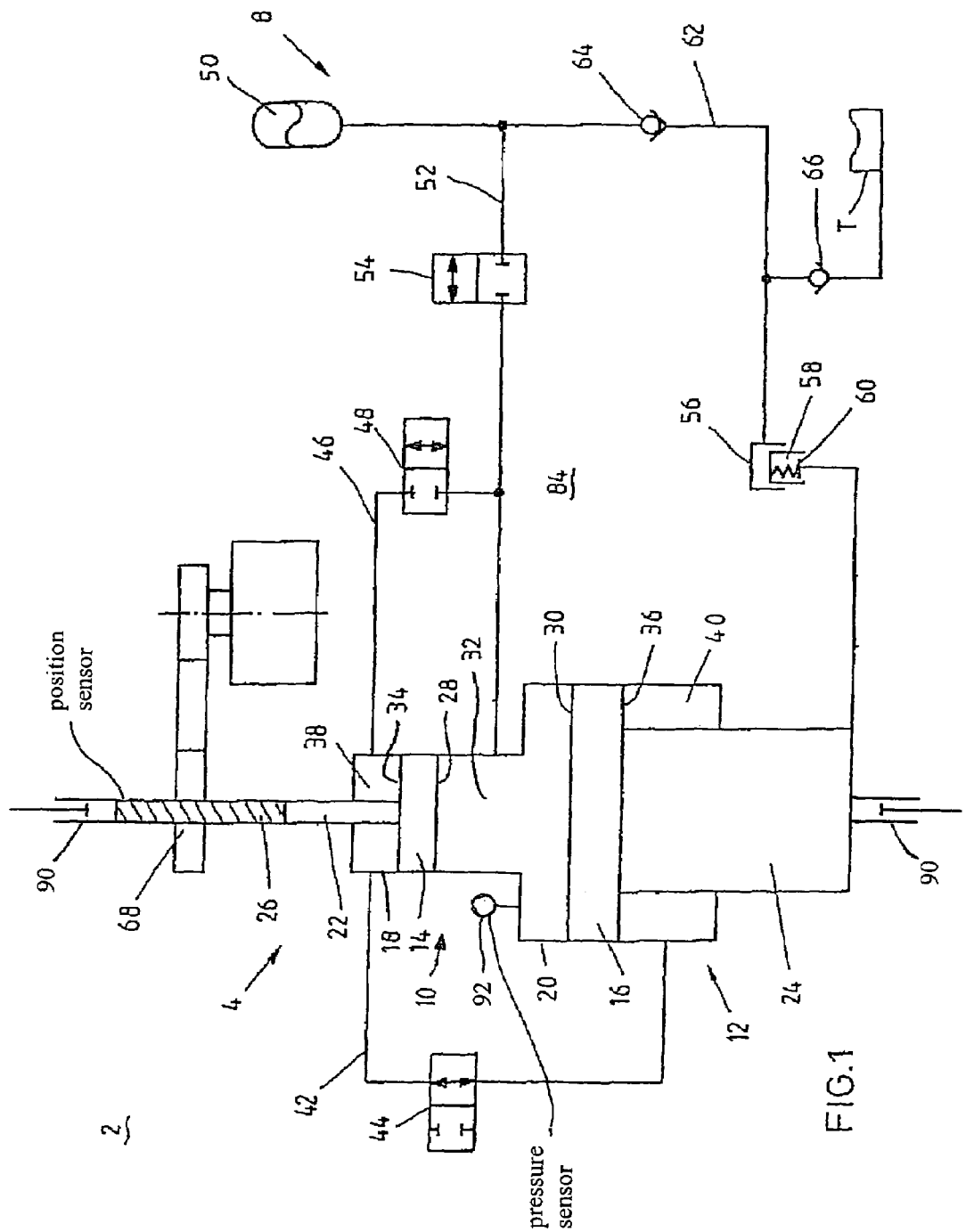

The invention concerns a drive mechanism in accordance with the preamble of claim 1.

The like electromechanical-hydraulic drive mechanisms are employed with working machines where rapid actuating movements and high forces must be realized. Preferred working machines are blanking machines, nibbling machines, presses, and plastics injection molding machines.

A drive mechanism for plastics injection molding machines is disclosed in DE 101 35 516 A1 to the same applicant. The drive mechanism comprises a hydraulic force transmitting element which is connected via pressure lines with hydraulic actuation means of a mold backing plate. The force transmitting element has a primary and a secondary piston/cylinder unit comprising a small primary piston and a large secondary piston. The two piston/cylinder units are arranged in a nested configuration, wherein the primary piston and thus the mold backing plate is adapted to be displaced by means of an electric spindle drive. In order to adjust a zero position of the drive mechanism, e.g., as a result of a leakage, the mold backing plate is displaced against a mechanical stop into a completely opened position. Subsequently a pressure medium connection between the actuation means and the force transmitting element is controlled open through the intermediary of a valve, and the secondary piston is displaced into a position corresponding to the opened position of the mold backing plate. After adjustment of the zero position, the valve is again taken into its blocking position, and a new work cycle may begin.

It is a drawback in this known solution that the adjustment of the zero position is very time-consuming. Moreover it is a drawback that high dynamics of the drive mechanism, as demanded in blanking or nibbling machines, can not be realized by the known force transmitting element.

It is an object of the present invention to furnish a drive mechanism that eliminates the above mentioned drawbacks.

This object is achieved by a drive mechanism having the features in accordance with claim 1.

The drive mechanism in accordance with the invention comprises a force transmitting element and a spindle drive. The force transmitting element comprises a primary unit and a secondary unit with one differential piston each. The units are arranged such that the large effective surfaces of the pistons jointly define a cylinder chamber, and the small effective surfaces of the pistons each define one annular chamber, with the annular chambers being in hydraulic communication with each other. The primary piston is adapted to be actuated by the spindle drive. The secondary piston acts indirectly or directly on a workpiece. In accordance with the invention, a pre-tensioning means for applying a pre-tensioning pressure to the cylinder chamber is provided.

It is advantageous in the drive mechanism in accordance with the invention that it possesses high dynamics, inasmuch as the pressure difference acting in the direction of force build-up is increased by the pre-tension.

The pre-tensioning means may be added on or deactivated through the intermediary of a pre-tensioning valve. It may be a pump and/or a hydraulic accumulator. For supplying the hydraulic accumulator a feed pump may be employed which is, for instance, driven by the secondary unit, so that additional pressure medium is supplied from a tank and the hydraulic accumulator may be charged. Advantageously the feed pump has the form of a plunger pump with a plunger piston, wherein a pressure is present at the secondary piston via a spring on the plunger piston, so that from a particular limit pressure the feed pump ceases to further charge the hydraulic accumulator. As the pressure medium it is possible to use water.

The annular chamber of the primary piston unit and the annular chamber of the secondary piston unit are in hydraulic communication via a pressure line. In accordance with one embodiment, an adjusting valve is provided in the pressure line for controlling this hydraulic connection open and closed. During a zero position adjustment of the drive mechanism, this adjusting valve is taken into a blocking position whereby the secondary piston is immobilized hydraulically, while it is otherwise in a through position so that the secondary piston is displaceable. In order to determine the correctly adjusted zero position and in order to determine whether the zero position should be adjusted anew, a path and/or a pressure measuring system is provided which detects the distance between the two differential pistons and/or the pressure, mainly in the cylinder chamber.

Moreover the annular chamber of the primary piston unit is in hydraulic communication with the cylinder chamber. This connection is also adapted to be controlled open and closed through the intermediary of a valve, hereinafter referred to as a displacement valve. Thus pressure medium may be displaced from the one chamber into the other chamber, and the primary piston may be moved—e.g., while the secondary piston is stationary—into a zero position.

In order to enhance the force whereby the secondary piston indirectly or directly attacks at a workpiece, several primary units may be operated in synchronicity. Here one respective spindle drive may be associated to one primary unit, or one spindle drive drives several spindles through the intermediary of a linkage. Basically it is an advantage of several primary pistons present independently of each other that the single engagement positions of the spindles/spindle nuts connected with the primary pistons may be altered, and thus the service life of the spindles may be extended.

In order to obtain a highly compact construction of the drive mechanism, the cylinder housing of the primary unit may be encompassed by the cylinder housing of the secondary unit. This construction may be made even more compact if the primary unit plunges into the secondary piston at least with an end portion thereof.

Further advantageous embodiments are subject matter of further subclaims.

Figure 2:
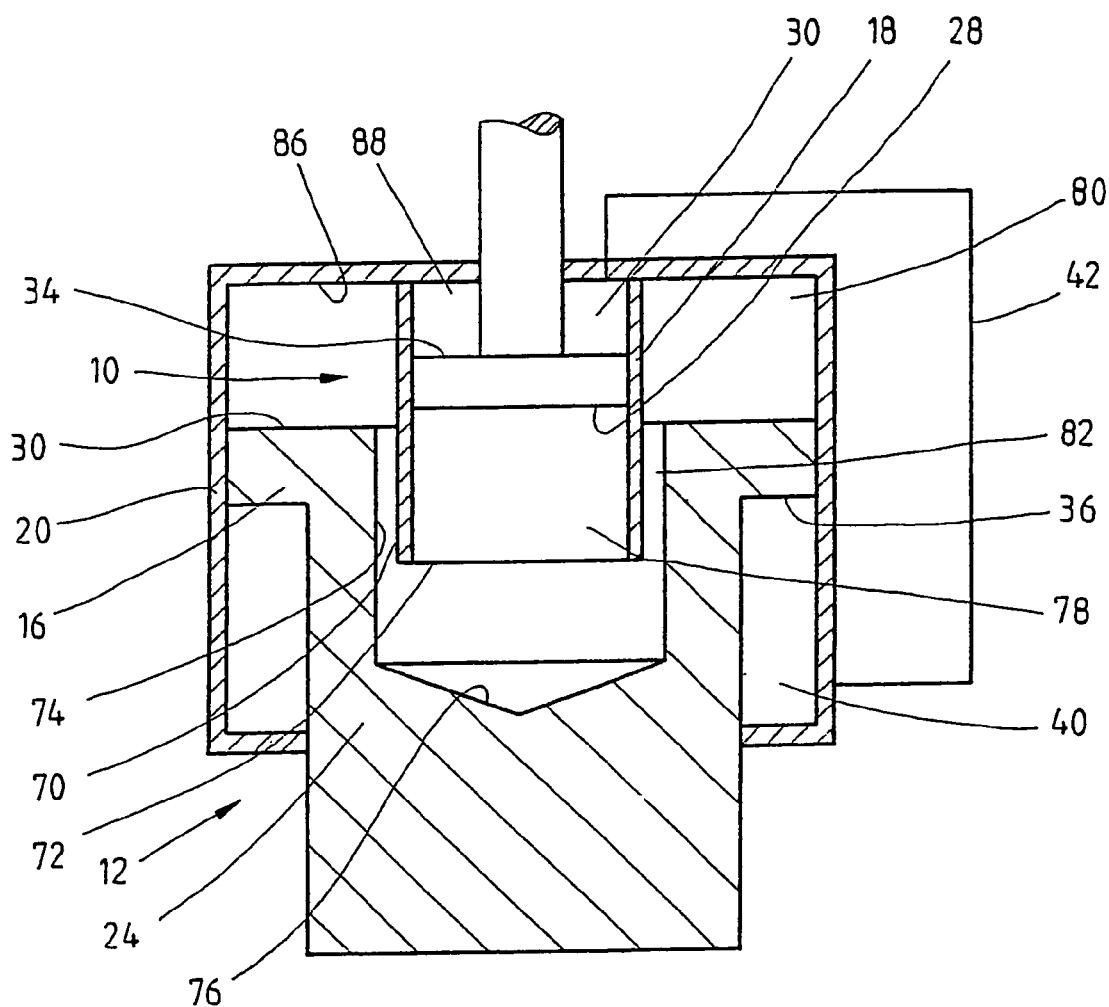

In the following a detailed explanation of preferred embodiments of the invention shall be given by referring to schematic representations, wherein:

FIG. 1 shows a drive mechanism in accordance with the invention comprising a hydraulic accumulator for pre-tensioning, and FIG. 2 shows a force transmitting element comprising a primary unit accommodated in a secondary unit.

FIG. 1 shows a preferred drive mechanism 2 in accordance with the invention, in particular for driving blanking, or nibbling machines, comprising a force transmitting element 4, a spindle drive 6, and pre-tensioning means 8 for pre-tensioning the force transmitting element 4.

The force transmitting element 4 comprises a primary unit 10 and a secondary unit 12. Both units 10, 12 have one respective primary or secondary piston 14, 16 accommodated in a cylinder housing 18, 20 and having the form of a differential piston. The pistons 14, 16 each have a piston rod 22, 24 which extends through the cylinder housing 18, 20 at the end face side. The piston rod 22 of the primary unit 10 is attacked by a spindle 26 which is in operative connection with a spindle nut 68 of the spindle drive 6 for driving the force transmitting element 4. The piston rod 24 of the secondary unit 12 is, e.g., adapted to be taken indirectly or directly into contact with a workpiece to be processed (not shown), so that the workpiece may be subjected to a high force.

In order to determine a distance between the two pistons 14, 16 and/or in order to measure a pressure in the cylinder chamber 32, a path measure system 90 and/or a pressure measuring system 92 is provided. By means of the measured distance and/or pressure, an alteration of the relative position of the pistons 14, 16 and/or an alteration of the pressure in the cylinder chamber 32 may be determined, so that any drifting apart of the pistons 14, 16 may be detected. A drifting apart of the pistons 14, 16 occurs, e.g., as a result of a leakage towards the inside, with pressure medium flowing from the annular chambers 38, 40 subjected to a higher pressure via the pistons 14, 16 into the cylinder chamber 32. Moreover with the aid of the relative distance of the two pistons 14, 16 as detected with the aid of the path measuring system 90, a zero position adjustment of the drive mechanism 2 may be performed in a simple manner. A more detailed description of the adjustment of the zero position will be given in the general description of the operation of the represented embodiment of the drive mechanism 2 in accordance with the invention.

In the embodiment in accordance with FIG. 1 only one primary unit 10 is provided, however it is also possible for a plurality of primary units 10 to act on a secondary piston 16. If a plurality of primary units 10 are provided, a separate spindle drive 6 may be associated to each of the primary units 10. Another alternative provides one spindle drive 6 for all of the primary units 10, which is then in operative connection with the single primary pistons 14, e.g., through a linkage operative connection. It is an advantage of a plurality of primary pistons 14 acting on one secondary piston 16 that the engagement positions of the single spindles 26 of the spindle drives 6 may be altered by means of the spindle nuts 68. In other words, e.g., the distance of the primary piston 14 is reduced by displacing the spindle drive 6 towards the secondary piston 16, while the distance of a second primary piston is increased correspondingly, so that changing spindle portions are engaged or loaded, and a more homogeneous wear of the spindle thread 26 may take place.

The pistons 14, 16 each have large and small effective surfaces 28, 30, 34, 36. The large effective surfaces 28, 30 define a cylinder chamber 32, and the small effective surfaces 34, 36 define one annular chamber 38, 40 each. From the small effective surfaces 34, 36 the piston rods 22, 24 extend, so that the small effective surfaces 34, 36 are reduced in comparison with the large effective surfaces by the area of cross-section of the respective piston rod 22, 24.

The annular chambers 38, 40 are in hydraulic communication through a pressure line 42, with an adjusting valve 44 having a through position and a blocking position being arranged in the pressure line 42 for interrupting this connection.

The cylinder chamber 32 is in hydraulic communication with the annular chamber 38 of the primary unit 10 via a cylinder line 46. In order to control this connection closed and open, a pre-tensioning valve 48 having a through position and a blocking position is also provided in this cylinder line 46.

In the represented embodiment, the pre-tensioning means 8 of the force transmitting elements 4 is a hydraulic accumulator 50. It is in hydraulic communication with the cylinder chamber 32 via an accumulator line 52, with a pre-tensioning valve 54 having a through position and a blocking position being provided in the accumulator line 52 for establishing and interrupting this hydraulic connection.

In order to compensate an outward leakage that occurs where the piston rods 22, 24 extend through the cylinder housing 18, 20, a feed pump 56 is provided which conveys pressure medium, via a tank line 62 opening into the accumulator line 52, from a tank T into the hydraulic system and thus charges the hydraulic accumulator 50. The feed pump 56 preferably has the form of a plunger pump having a plunger piston 58, wherein it is mechanically or hydraulically in operative connection with the secondary piston 16, and is driven as a function of the stroke thereof to convey pressure medium into the hydraulic system. The movement of the secondary piston 16 is transmitted via a spring 60 to the plunger piston 58. Its spring rate is designed such that only a force corresponding to the maximum charging pressure of the hydraulic accumulator 50 may be transmitted to the plunger piston 58. When this force is exceeded, the spring 60 is compressed, so that pressure increases can not occur at the hydraulic accumulator 50. In order to prevent pressure medium from flowing back in the direction of the feed pump 56 or into the tank T, a respective check valve 64, 66 is arranged in the tank line 62 and immediately in front of the tank T.

The operation of the drive mechanism 2 in accordance with the invention shall be described in the following. The operation, or one work cycle, respectively, is essentially subdivided into pre-tensioning, advance of the secondary piston 16 from a basic position, blanking, and a return of the secondary piston 16 into the basic position. Depending on the leakage loss, a zero position adjustment for adjusting the basic position must be performed after a multiplicity of work cycles.

At the beginning of a work cycles the drive mechanism 2 is in a basic position. In this position the pistons 14, 16 are adjusted at a defined distance from each other. The drive mechanism 2 is adjusted in its zero position.

In this basic position, the drive mechanism 2 is pre-tensioned in accordance with the invention. The adjusting valve 44 and the pre-tensioning valve 54 are opened, and the displacement valve 48 is closed. Through the opening of the adjusting valve 44 the two annular chambers 38, 40 are in connection with each other, so that a pressure balance exists between these chambers 38, 40. By means of the hydraulic accumulator 50 the cylinder chamber 32 is subjected to a pre-tensioning pressure which is present at the large effective surfaces 28, 30 of the primary piston 14 and of the secondary piston 16. As the primary piston 14 is, however, immobilized in its position by the operative engagement of the spindle 26 with the spindle nut 68 of the spindle drive 6, and thus the volume of the annular chamber 38 can not be increased, the secondary piston 16 can not be moved from its current position. Accordingly a pre-tensioning pressure builds up in the cylinder chamber 32 through the hydraulic accumulator 50. Once the corresponding pre-tensioning pressure prevails in the cylinder chamber 32, the pre-tensioning valve 54 is closed and the hydraulic accumulator 50 is blocked relative to the cylinder chamber 32.

Upon the advance following pre-tensioning, the secondary piston 16 is indirectly or directly taken into contact with a workpiece to be processed. The displacement valve 48 and the pre-tensioning valve 54 are closed and the adjusting valve 44 is open. The spindle drive 6 is driven, and the spindle 26 performs a rotating movement, so that the primary piston 14 is retracted. The secondary piston 16 extends in correspondence to the primary piston 14, and pressure medium is displaced from the annular chamber 40 of the secondary unit 12 into the annular chamber 38 of the primary unit 10 via the pressure line 42. The volume ratios of the annular chambers 38, 40 are selected such that the volume increase of the annular chamber 38 of the primary unit 10 corresponds to the volume decrease of the annular chamber 40 of the secondary unit 12: the secondary piston 16 is lowered towards the workpiece.

During blanking, the displacement valve 48 and the pre-tensioning valve 54 remain closed and the adjusting valve 44 remains open. The spindle drive 6 is driven, and the spindle 26 performs a rotating movement which further retracts the primary piston 14. As the secondary piston 16 had, however, indirectly or directly been taken into contact with the workpiece to be processed during the advance, an instantaneous extension of the secondary piston 16 is impeded. Accordingly the pressure medium inside the cylinder chamber 32 is compressed as far as permitted by its compressibility. The cylinder chamber 32 is reduced in size accordingly, and the size of the annular chamber 38 of the primary unit is increased, so that the pressure in the cylinder chamber 32 increases above the pre-tensioning pressure and the pressure in the annular chambers 38, 40 drops. Thus the pressure difference acting in the direction of the blanking force to be applied increases. From a particular pressure in the cylinder chamber 32 the secondary piston 16 can develop the force required for blanking. This blanking force is very rapidly built up owing to the pre-tension, so that the blanking step is performed with high dynamics. Following blanking and the advance of the secondary piston 16, the pre-tensioning pressure again establishes in the cylinder chamber 32.

Upon retraction of the secondary piston 16 into its basic position in order to perform a new work cycle, the displacement valve 48 and the pre-tensioning valve 54 are in the blocking position and the adjusting valve 44 is open. The spindle drive 6 is driven such that the spindle 26 performs an opposite rotating movement, with the primary piston 34 being extended. The annular chamber 38 of the primary unit 10 is reduced in size, and the pressure medium is displaced via the adjusting valve 44 into the annular chamber 40 of the secondary unit 12. The annular chamber 40 correspondingly increases in size and moves the secondary piston 16 in a retracting direction. Here the secondary piston 16 is transferred into its home position owing to the rapidly retracting primary piston 14, so that a new work cycle may start quickly.

Depending on the relative position of the two pistons 14, 16 and/or the pressure prevailing in the cylinder chamber 32, an adjustment of the zero position of the drive mechanism 2 has to be performed after several work cycles. Hereby the pistons 14, 16 are again taken into their defined mutual position. The alteration of the relative position of the two pistons 14, 16 and/or of the pressure in the cylinder chamber 32 mainly occurs due to leakages.

Leakages may occur owing to an inner and an outer leakage. In the case of an inner leakage, pressure medium penetrates from the annular chambers 38, 40 via the pistons 14, 16 into the cylinder chamber 32. In the case of an outer leakage, pressure medium penetrates outwardly in the range of the piston rods 22, 24 from the annular chambers 38, 40 into the external surroundings 84.

The inner leakage, or inward leakage, is essentially based on the pressure in the annular chambers 38, 40 that is on the average higher in comparison with the cylinder chamber 32. Owing to the pressure medium penetrating from the annular chambers 38, 40, the inward leakage results in a size reduction of the annular chamber 40 and in an increase of size of the cylinder chamber 32, and thus in a drop of the secondary piston 16. Moreover the pressure in the cylinder chamber 32 drops. Thanks to the pre-tension in accordance with the invention, however, the pressure in the cylinder chamber 32 is taken to such a high level that low pressure can not establish in the cylinder chamber 32.

Owing to the discharge of the pressure medium in the case of an outward leakage to the external surroundings 84, pressure medium is withdrawn from the entire hydraulic system, with the pressure in the system dropping as a result. Up to a particular pressure medium quantity this pressure medium loss may be compensated by the hydraulic accumulator 50. In order to be able to maintain the pressure on a constant level over a prolonged period of time, however, it is possible to replenish pressure medium into the hydraulic system from a tank T by means of the feed pump 56 during a stroke of the secondary piston 16 to thus charge the hydraulic accumulator 50.

For an adjustment of the zero position following a drifting apart, the adjusting valve 44 and the pre-tensioning valve 54 are in a blocking position, and the displacement valve 48 is open. Due to the blocking position of the adjusting valve 44 the annular chambers 38, 40 are separated from each other, so that pressure medium can not flow from the annular chamber 40 of the secondary unit 12 into the annular chamber 38 of the primary unit 10. The secondary piston 16 is hydraulically immobilized in its position. By means of the path measuring system 90 the current distance between the two pistons 14, 16 is detected, and the spindle drive is actuated such that the predetermined relative distance between the pistons 14, 16 is adjusted. As a result of the opened displacement valve 48, the pressure medium connection between the annular chamber 38 of the primary unit 10 and the cylinder chamber 32 is established, so that when the primary piston 14 is displaced in the direction of the secondary piston 16 for reducing the distance, pressure medium may be displaced from the cylinder chamber 32 into the annular chamber 38. Contrary to known solutions, a time-consuming extension of the secondary piston 16 into an opened position for the purpose of zero position adjustment is thus not necessary any more in accordance with the invention. The zero position adjustment performed in accordance with the invention may be performed rapidly and easily virtually any time. As soon as the nominal distance between the two pistons 14, 16 is again adjusted, the drive mechanism 2 is in its defined zero position or basic position, so that—optionally after a repeated pre-tensioning of the system—new work cycles may start. Such a rapid zero position adjustment may also be performed with the pressure measuring system 92. In this case the pressure in the cylinder chamber 32 is measured and compared to a nominal pressure.

FIG. 2 shows a force transmitting element 4 comprising a primary unit 10 that is encompassed by a secondary unit 12. Such a construction is characterized by higher compactness owing to the reduced axial length of the force transmitting element 4.

The secondary piston 16 includes a recess 70 provided in the range of the large effective surface 30 which extends in the present embodiment into its piston rod 24, i.e., into the end portion having a small outer diameter. The primary unit 10 plunges into the recess 70 by an end portion 72 of its cylinder housing 18. By a second end portion 88 of its cylinder housing 18 the primary unit 10 is attached at the bottom 86 of the cylinder housing 20 of the secondary unit 12. The cylinder housing 18 of the primary unit 10 is spaced apart from the inner circumference 74 and from the bottom 76 of the recess 70, so that a hydraulic connection between a cylinder chamber 78 of the primary unit 10 and a cylinder chamber 80 of the secondary unit is established via an annular gap 82, and thus the large effective surfaces 28, 30 of the two pistons 14, 16 are subjected to an identical pressure. The two cylinder chambers 78, 80 correspond to the cylinder chamber 32 of the previous embodiment in accordance with FIG. 1. The annular chambers 38, 40 of the primary and secondary units 10, 12 are axially delimited by the small effective surfaces 34, 36 and are in hydraulic communication with each other via a pressure line 42. In correspondence to the afore-described embodiment in accordance with FIG. 1, a valve (not shown) for controlling this pressure medium connection open and closed is arranged in this pressure line 42 between the annular chambers 38, 40.

The operation is analogous to the one of the afore-described embodiment in accordance with FIG. 1, so that a repeated discussion is omitted.

What is disclosed is a drive mechanism, in particular for blanking and nibbling machines, comprising a hydraulic force transmitting element and a spindle drive for driving the force transmitting element, wherein a pre-tensioning means for pre-tensioning the force transmitting element is provided.

LIST OF REFERENCE SYMBOLS 2 drive mechanism
4 force transmitting element
6 spindle drive
8 pre-tensioning means
10 primary unit
12 secondary unit
14 primary piston
16 secondary piston
18 cylinder housing
20 cylinder housing
22 piston rod
24 piston rod
26 spindle
28 large effective surface
30 large effective surface
32 cylinder chamber
34 small effective surface
36 small effective surface
38 annular chamber
40 annular chamber
42 pressure line
44 adjusting valve
46 cylinder line
48 displacement valve
50 hydraulic accumulator
52 accumulator line
54 pre-tensioning valve
56 feed pump
58 plunger piston
60 spring
62 tank line
64 check valve
66 check valve
68 spindle nut
70 recess
72 end portion
74 inner circumference
76 bottom
78 cylinder chamber
80 cylinder chamber
82 annular gap
84 external surroundings
86 bottom
88 end portion

The invention claimed is:

1. A drive mechanism, comprising:
 a hydraulic force transmitting element having a primary unit with a small primary piston and a secondary unit with a large secondary piston whose large effective surfaces jointly define a cylinder chamber, and whose small effective surfaces each define one annular chamber, wherein the annular chambers are in hydraulic communication with each other, and comprising a spindle drive for driving the primary piston, wherein the secondary piston indirectly or directly acts on a workpiece;
 a pre-tensioning means for subjecting the cylinder chamber to a pre-tensioning pressure, increasing the pressure difference in direction of the force built-up by the secondary piston; and
 a path measuring system for detecting a relative position of the primary and secondary pistons.

2. The drive mechanism in accordance with claim 1, wherein the pre-tensioning means is selectively activated and deactivated through the intermediary of a pre-tensioning valve.

3. The drive mechanism in accordance with claim 1, wherein the drive mechanism is for a blanking machine, a nibbling machine, or a blanking and nibbling machine.

4. The drive mechanism in accordance with claim 1, wherein the pre-tensioning means is a hydraulic accumulator or a pump.

5. The drive mechanism in accordance with claim 1, further comprising a feed pump for supplying the pre-tensioning means, which is adapted to be driven by the secondary piston.

6. The drive mechanism in accordance with claim 5, wherein a pressure at the secondary piston acts via a spring on a plunger piston of the feed pump.

7. The drive mechanism in accordance with claim 1, wherein several spindles are arranged in parallel.

8. The drive mechanism in accordance with claim 1, wherein the cylinder housing of the primary unit is encompassed by the cylinder housing of the secondary unit.

9. The drive mechanism in accordance with claim 8, wherein an end portion of the cylinder housing of the primary unit plunges into a recess of the secondary piston.

10. The drive mechanism in accordance with claim 1, wherein a pressure medium is water.

11. The drive mechanism in accordance with claim 1, wherein the annular chambers are in hydraulic communication with each other via a pressure line, with an adjusting valve for opening and closing a hydraulic connection arranged in the pressure line.

12. The drive mechanism in accordance with claim 1, wherein the cylinder chamber is in hydraulic communication with the annular chamber of the primary unit, and further comprising a displacement valve for opening or closing a hydraulic connection between the cylinder chamber and the annular chamber of the primary unit.

* * * * *